United States Patent
Ham

(10) Patent No.: US 6,991,112 B2
(45) Date of Patent: Jan. 31, 2006

(54) DISPOSABLE FILTER CARTRIDGE

(75) Inventor: Sangsun Ham, Kyungki-Do (KR)

(73) Assignee: Romanow Enterprises, Inc., Kingston, MA (US)

( * ) Notice: Subject to any disclaimer, the term of this patent is extended or adjusted under 35 U.S.C. 154(b) by 219 days.

(21) Appl. No.: 10/373,311

(22) Filed: Feb. 24, 2003

(65) Prior Publication Data
US 2003/0168400 A1  Sep. 11, 2003

Related U.S. Application Data
(60) Provisional application No. 60/361,965, filed on Mar. 5, 2002.

(51) Int. Cl.
B01D 27/08 (2006.01)
(52) U.S. Cl. ............ 210/450; 210/493.2; 277/918
(58) Field of Classification Search .............. 210/450, 210/493.2, 442, 444, 445, 455; 55/502; 277/918
See application file for complete search history.

(56) References Cited

U.S. PATENT DOCUMENTS

| | | | |
|---|---|---|---|
| 2,627,350 A * | 2/1953 | Wicks ..................... 210/458 |
| 3,186,552 A * | 6/1965 | Cutler ..................... 210/457 |
| 3,307,336 A | 3/1967 | Dewsberry ................ 55/337 |
| 3,616,618 A | 11/1971 | Gronholz et al. ........... 55/337 |
| 3,672,130 A | 6/1972 | Sullivan et al. ............ 55/323 |
| 4,020,783 A | 5/1977 | Anderson et al. ..... 116/114 PV |
| 4,135,899 A | 1/1979 | Gauer ..................... 55/482 |
| 4,171,963 A | 10/1979 | Schuler ..................... 55/302 |
| 4,174,204 A | 11/1979 | Chase ..................... 55/283 |
| 4,211,543 A | 7/1980 | Tokar et al. ................ 55/485 |
| 4,243,397 A | 1/1981 | Tokar et al. ................ 55/487 |
| 4,261,710 A | 4/1981 | Sullivan ..................... 55/96 |
| 4,278,455 A | 7/1981 | Nardi ..................... 55/337 |
| 4,304,580 A | 12/1981 | Gehl et al. ................ 55/482 |
| 4,350,509 A | 9/1982 | Alseth et al. .............. 55/337 |
| 4,536,291 A | 8/1985 | Hoffmann et al. ........ 210/457 |
| 4,720,292 A | 1/1988 | Engel et al. ............... 55/337 |
| 4,735,716 A | 4/1988 | Petrucci et al. ........... 210/232 |
| 4,834,885 A | 5/1989 | Misgen et al. ............ 210/440 |
| 4,906,365 A | 3/1990 | Baumann et al. ........ 210/238 |
| 4,948,505 A | 8/1990 | Petrucci et al. ........... 210/238 |
| 4,969,994 A | 11/1990 | Misgen et al. ........... 210/232 |
| 5,064,458 A | 11/1991 | Machado ................. 55/482 |

(Continued)

FOREIGN PATENT DOCUMENTS
DE         2145708         3/1972

(Continued)

Primary Examiner—Terry K. Cecil
(74) Attorney, Agent, or Firm—Weingarten, Schurgin, Gagnebin & Lebovici LLP

(57) ABSTRACT

An improved disposable filter cartridge for use in a filter housing includes a pleated filter member and first and second plastic end caps mounted to the ends of the filter member. The first end cap has an inner edge defining a central opening. In one embodiment, an elastomeric annular gasket is removably mounted to the inner edge of the first end cap. In another embodiment, a predetermined surface of elastomeric annular gasket is adhered to a confronting surface of the first end cap. At least one annular ridge projects into the first end cap opening. The at least one ridge abuts the outer surface of an inlet tube to form a fluidic seal with the inlet tube when the disposable filter cartridge is mounted within a cooperative filter housing. The second end cap may include an elastomeric annular gasket having an angled sealing surface configured to form a seal against the confronting end of an inlet tube.

16 Claims, 2 Drawing Sheets

U.S. PATENT DOCUMENTS

| | | | | |
|---|---|---|---|---|
| 5,082,476 | A | 1/1992 | Kahlbaugh et al. | 55/97 |
| 5,096,591 | A | 3/1992 | Benn | 210/651 |
| 5,112,372 | A | 5/1992 | Boeckermann et al. | 55/276 |
| 5,120,337 | A | 6/1992 | Benzler et al. | 55/482 |
| 5,171,342 | A | 12/1992 | Trefz | 55/487 |
| 5,374,355 | A | 12/1994 | Habiger et al. | 210/440 |
| 5,400,590 | A | 3/1995 | Wagner et al. | 60/274 |
| 5,415,677 | A | 5/1995 | Ager et al. | 55/482 |
| 5,484,466 | A * | 1/1996 | Brown et al. | 55/498 |
| 5,487,767 | A | 1/1996 | Brown | 55/357 |
| 5,516,425 | A | 5/1996 | Brieden et al. | 210/232 |
| 5,538,626 | A | 7/1996 | Baumann | 210/130 |
| 5,547,480 | A | 8/1996 | Coulonvaux | 55/498 |
| 5,549,821 | A | 8/1996 | Bounnakhom et al. | 210/232 |
| 5,556,440 | A | 9/1996 | Mullins et al. | 55/498 |
| 5,556,542 | A | 9/1996 | Berman et al. | 210/232 |
| 5,660,729 | A | 8/1997 | Baumann | 210/457 |
| 5,685,985 | A | 11/1997 | Brown et al. | 210/450 |
| 5,688,396 | A | 11/1997 | Baumann et al. | 210/130 |
| 5,693,109 | A | 12/1997 | Coulonvaux | 55/498 |
| 5,698,097 | A | 12/1997 | Gebert et al. | 210/248 |
| 5,702,602 | A | 12/1997 | Brown et al. | 210/342 |
| 5,718,825 | A | 2/1998 | Greive et al. | 210/298 |
| 5,730,769 | A | 3/1998 | Dungs et al. | 55/385.3 |
| 5,738,785 | A | 4/1998 | Brown et al. | 210/232 |
| 5,762,669 | A | 6/1998 | Kahlbaugh et al. | 55/486 |
| 5,770,054 | A | 6/1998 | Ardes | 210/130 |
| 5,783,078 | A * | 7/1998 | Roll et al. | 210/444 |
| 5,792,227 | A | 8/1998 | Kahlbaugh et al. | 55/486 |
| 5,820,646 | A | 10/1998 | Gillingham et al. | 55/488 |
| 5,833,843 | A | 11/1998 | Covington | 210/130 |
| 5,850,183 | A | 12/1998 | Berry, III | 340/607 |
| 5,863,313 | A | 1/1999 | Coulonvaux | 55/498 |
| 5,895,574 | A | 4/1999 | Friedmann et al. | 210/443 |
| 5,897,676 | A | 4/1999 | Engel et al. | 55/498 |
| 5,922,196 | A | 7/1999 | Baumann | 210/232 |
| 5,928,511 | A | 7/1999 | Messner et al. | 210/248 |
| 5,938,804 | A | 8/1999 | Engel et al. | 55/428 |
| 6,016,923 | A | 1/2000 | Baumann | 210/440 |
| 6,027,640 | A | 2/2000 | Covington et al. | 210/130 |
| 6,086,763 | A | 7/2000 | Baumann | 210/497.01 |
| 6,099,729 | A * | 8/2000 | Cella et al. | 210/315 |
| 6,206,205 | B1 | 3/2001 | Durre et al. | 210/457 |
| 6,235,089 | B1 | 5/2001 | Erdmannsdoerfer | 96/55 |
| 6,251,273 | B1 | 6/2001 | Jawurek et al. | 210/232 |
| 6,312,489 | B1 | 11/2001 | Ernst et al. | 55/385.3 |
| 6,322,697 | B1 | 11/2001 | Hacker et al. | 210/248 |
| 6,350,291 | B1 | 2/2002 | Gieseke et al. | 55/385.3 |
| 6,384,369 | B1 | 5/2002 | Stenersen et al. | 219/121.64 |
| 6,406,033 | B1 | 6/2002 | Jessberger | 277/616 |
| 6,485,635 | B1 | 11/2002 | Gandini et al. | 210/117 |
| 6,506,302 | B2 * | 1/2003 | Janik | 210/232 |
| 2002/0139735 | A1 | 10/2002 | Stenersen et al. | 210/168 |

FOREIGN PATENT DOCUMENTS

| | | |
|---|---|---|
| DE | 42 14 500 A1 | 11/1993 |
| DE | 0 559 011 B1 | 6/1995 |
| DE | 0559 011 B1 | 6/1995 |
| DE | 92 19 011 U1 | 1/1997 |
| DE | 42 25 144 C2 | 8/1997 |
| DE | 44 16 577 C2 | 7/1998 |
| DE | 196 05 425 C2 | 7/1998 |
| DE | 0 912 225 B1 | 8/2000 |

* cited by examiner

DISPOSABLE FILTER CARTRIDGE

CROSS REFERENCE TO RELATED APPLICATIONS

This application claims priority under 35 USC §119(e) of U.S. Provisional Patent Application No. 60/361,965 filed Mar. 5, 2002 and entitled AUTOMOTIVE FILTER.

STATEMENT REGARDING FEDERALLY SPONSORED RESEARCH OR DEVELOPMENT

Not Applicable

BACKGROUND OF THE INVENTION

The present invention relates to disposable filter cartridges and more specifically to a disposable filter cartridge having an improved end cap.

Filters are widely used to remove contaminates from the oil that is used to lubricate machinery such as internal combustion engines, hydraulic equipment, etc and additionally, for filtering other liquids. An filter typically includes a filter housing and a filter cartridge that is mountable in or to the housing. Typical oil filters in automotive applications are changed every several thousand miles and few of those filters are reusable. Consequently, large numbers of oil filters are disposed annually creating a significant environmental issue with respect to the used filters.

For many years filter cartridges employed metal structural members or housings to achieve the rigidity needed to prevent the filter from being crushed due to the internal pressures experienced by the filter. Filters have typically been produced as either cartridge type filters or spin-on filters.

Cartridge type filters employ a filter cartridge that is disposed within a filter housing. Cartridge type filters have have provided with metallic structural members that support a paper filter element. The use of such metallic structural members is typically undesirable due to the post removal pocessing complexities and costs associated with such cartridges.

Spin-on filters in metallic cans became popular due to the ease of replacement of such filters. The use of spin-on filters has become undesirable due to the disposal problems presented since such filters contain metal components as well as filtration elements having residues that may require post removal processing prior to disposal.

More recently, efforts have been made to develop what has been referred to as an environmentally friendly filter cartridge that is mountable within a housing and is fabricated solely of plastic supporting members and a paper filter element. Such a filter cartridge may be crushed prior to disposal and/or burned. Examples of disposable oil filter cartridges are disclosed in U.S. Pat. Nos. 5,685,985 and 5,702,602.

Conventional non-metallic filter cartridges include a generally cylindrical paper pleated filter member having a through bore. First and second end caps are bonded to opposing ends of the filter member. An opening is provided in each of the end caps. The opening in one of the end caps is sized to receive an inlet tube. To mount the cartridge, the cartridge is positioned in a mounting position such that the inlet tube extends through the opening in the first end cap. A fluid seal is provided between the inner surface of the first end cap opening and the inlet tube. Consequently a liquid pumped into the disposable filter must pass through the pleated filter member prior to exiting the filter housing and particles flowing through the filter are trapped within the filter member.

A known disposable filter cartridge includes a felt gasket that is thermally bonded at the periphery of an opening in the end cap. The need to thermally bond the felt gasket to the end cap to maintain the gasket in position adds complexity and cost to the manufacturing process. Accordingly, it would be desirable to have an end cap design for a filter cartridge that provides an effective seal and that can be manufactured in high volume for low cost.

BRIEF SUMMARY OF THE INVENTION

In accordance with the present invention an improved disposable filter cartridge is disclosed. The filter cartridge may be employed to filter oil, fuel, and other liquids. The filter cartridge includes a generally cylindrical pleated filter member and first and second integrally molded plastic end caps thermally bonded, glued or otherwise affixed to the ends of the pleated filter to form a fluidic seal between the pleated filter member and the respective end caps. At least the first end cap includes an opening defined by a generally circular inner edge. The opening is sized to receive an inlet tube that carries the flow of the liquid to be filtered to the filter cartridge.

An elastomeric annular gasket is mounted to the inner edge of the first end cap to provide an effective fluidic seal between the first end cap and the inlet tube when the cartride is mounted within a filter housing with the inlet tube extending through the gasketed opening. In one embodiment, the gasket includes a projection that is sized to snugly fit within a corresponding recess formed in the inner edge of the first end cap. More specifically, the cross-section of the gasket projection generally corresponds to the shape of the recess. The gasket may thus be fitted to the first end cap with the gasket projection disposed in the recess to securely retain the gasket to the first end cap mechanically without bonding or the use of an adhesive.

In another embodiment, the gasket and the inner edge have plural contact surfaces when the gasket is mated to the inner edge of the first end cap, and an adhesive is employed to affix the gasket to the first end cap. The adhesive is selectively applied to at least one but not all of the contact surfaces between the gasket and the first end cap.

In each of the referenced embodiments, the surface of the gasket facing the opening includes at least one annular ridge that extends into the opening. The at least one ridge abuts the outer surface of the inlet tube to provide an effective fluidic seal between the first end cap and inlet tube.

An improved second end cap includes an annular gasket that provides a sealing surface for a confronting end of the inlet tube.

Other features, aspects and advantages of the invention will be apparent to those of ordinary skill in the art from the Detailed Description of the Invention that follows.

BRIEF DESCRIPTION OF THE SEVERAL VIEWS OF THE DRAWING

The invention will be more fully understood by reference to the following Detailed Description of the Invention in conjunction with the Drawing of which.

DETAILED DESCRIPTION OF THE INVENTION

U.S. Provisional Application No. 60/361,965 filed Mar. 5, 2002 and entitled AUTOMOTIVE FILTER is hereby incorporated by reference.

In accordance with the present invention, a disposable filter cartridge is disclosed. The filter cartridge may be employed to filter oil, fuel or other liquids. The disposable filter cartridge is fabricated of plastic and paper to simplify processing and disposal of the cartridge following removal of the filter cartridge, such as an oily cartridge from an oil filter housing.

Figure 1:
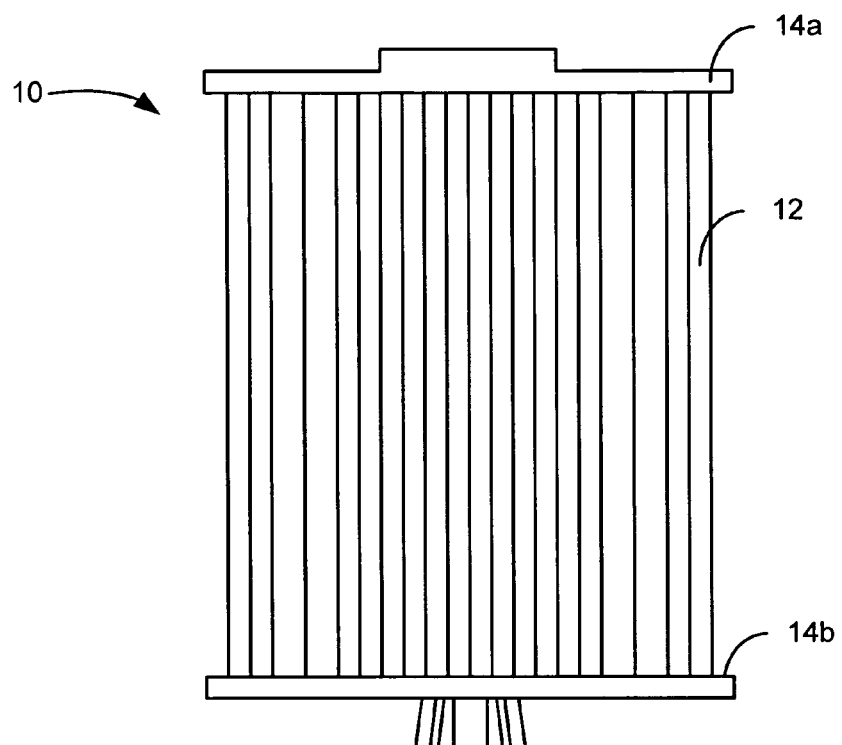
FIG. 1 is a cross-sectional view of a disposable filter cartridge in accordance with the present invention.

More specifically, referring to FIG. 1, an improved filter cartridge 10 includes a filter element 12 and first and second opposing end caps 14a and 14b respectively. The opposing end caps 14a and 14b are adhered or thermally bonded to the filter element 12 as known in the art. The filter element is preferably fabricated as a pleated filter paper filter element as known in the art. The end caps 14a, 14b are integrally formed molded plastic components and have generally circular openings defined by inner edges of the end caps.

Figure 2:
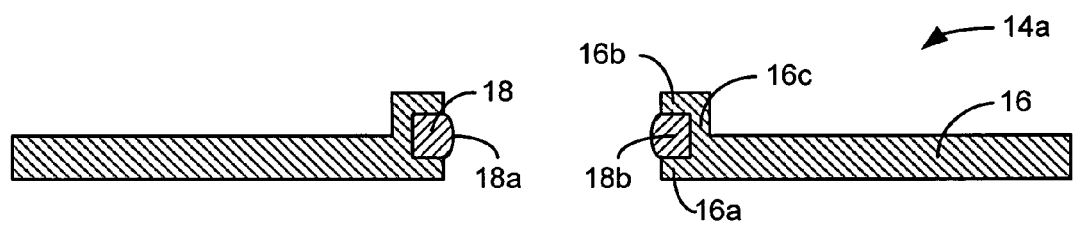
FIG. 2 is an enlarged cross-sectional view of an improved end cap design having an elastomeric gasket with a single annular ridge.

FIG. 2 depicts an enlarged cross section of the first end cap of FIG. 1. More specifically, the first end cap 14a includes an integrally formed plastic cap member 16 and a deformable elastomeric annular sealing gasket 18. The gasket 18 is disposed in a recess in the cap member 16 formed by opposing fingers 16a and 16b and a riser 16c. The gasket 18 has an inwardly facing surface having a curved cross section 18a. The inwarding facing surface of the gasket 18 abuts an inlet tube (not shown) to provide a fluidic seal between the cap member 16 and the inlet tube when the disposable cartridge 10 is mounted within a cooperative filter housing. A portion of the gasket 18b generally abuts and fits snugly within the inner surfaces of the recess. Upon positioning of the gasket 18 within the recess in the cap member 16, the gasket 18 is securely retained in the cap member 18 without the need for bonding or gluing of the gasket 18 to the cap member 16.

Figure 3:
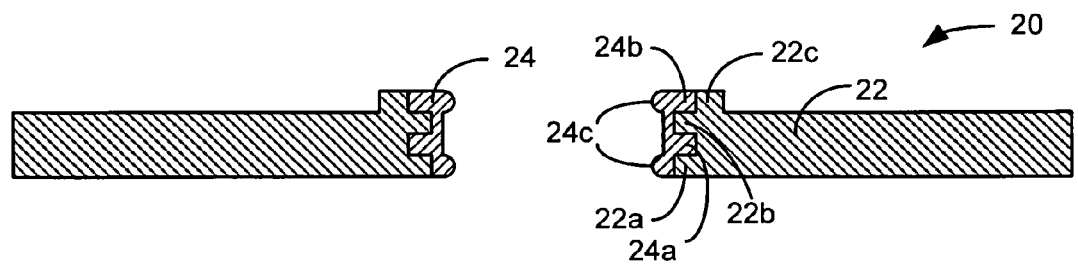
FIG. 3 is a cross-sectional view of an alternative end cap design for use in the disposable filter cartridge depicted in FIG. 1.

FIG. 3 depicts another embodiment of a first end cap. More specifically the first end cap 20 depicted in FIG. 3 includes a cap member 22 and an annular elastomeric sealing gasket 24. The cap member 22 includes first and second fingers 22a, 22b and a riser 22c that extends from the cap member 22 generally perpendicular to a plane defined by the top surface of the first end cap 22. A recess is defined in the inner edge of the cap member 22 between the fingers 22a and 22b and a notch is formed between the second finger 22b and the riser 22c. The gasket 24 includes a first projection 24a that fits snugly within the recess and generally corresponds in cross-section to the cross-section of the recess between the first and second fingers 22a and 22b. The gasket 24 also includes a second projection 24b that fits into the notch formed between the finger 22b and the riser 22c. In the present embodiment the top surface of the gasket 24 is generally co-planar with the top surface of the riser 22c, and the bottom surface of the gasket 24 is generally co-planar with the bottom surface of the finger 22a of the cap member 22.

The gasket depicted in FIG. 3 includes two inwardly facing annular spaced ridges. The ridges 24c in the illustrated gasket have a generally semi-circular cross-section although the ridges may be generally rectangular, trapezoidal or of any other suitable cross-section. The inward facing ridges 24c abut the outer surface of an inlet tube (not shown) when mounted within a cooperative filter housing to form an effective fluidic seal between the cap member 22 and the inlet tube. By reason of the snug fit of the projections 24a and 24b into the recess and notch of the cap member 22 when the gasket 24 is mounted to the cap member 22, gasket 24 is securely affixed the edge of the cap member 22 defining the opening without the need for thermal bonding or adhesives.

Figure 4:
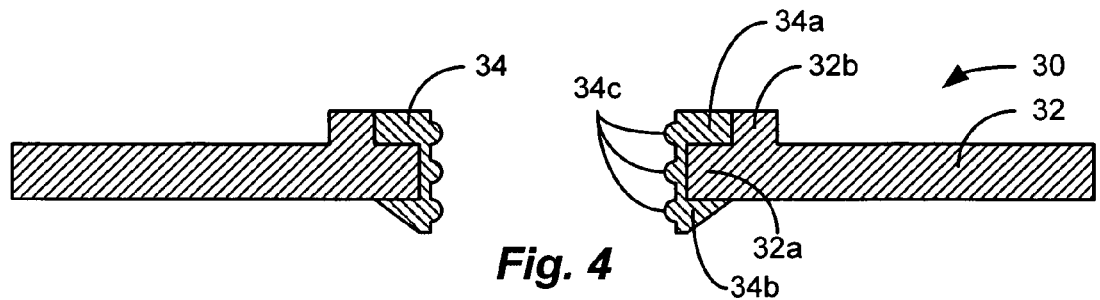
FIG. 4 is a cross-sectional view of a second alternative end cap design for use in the disposable filter cartridge depicted in FIG. 1.

Another embodiment of a first end member is depicted in FIG. 4. The first end member 30 includes a cap member 32 and an annular elastomeric gasket 34. The cap member 32 has an inner edge 32a defining an opening in the cap member 32 and an annular riser 32b that is generally perpendicular to the top surface of the cap member 32. The gasket 34 includes first and second projections 34a, 34b that are spaced apart by a distance corresponding to the thickness of the cap member inner edge 32a. The inner edge 32a of the cap member 32 extends into the recess formed between the projections 34a, 34b so that the projections 34a, 34b straddle the edge 32a of the cap member 32 when the gasket 34 is disposed over the gasket edge 32a in its mounting position. The projection 34a extends into the notch formed between the edge 32a and the riser 32b so as to provide further stability for the gasket 34 when mounted to the cap member 32. The top surface of the gasket 34 is generally co-planar with the top surface of the riser 32b as illustrated.

The gasket 34 in the illustrated embodiment includes three spaced annular ridges 34c that extend inward into the opening. In the illustrated embodiment, the ridges 34c have a generally semi-circular cross section although the ridges 34c may have a generally rectangular, trapezoidal or any other suitable cross-section. Additionally, while three inwardly projecting ridges 34c are depicted in the embodiment depicted FIG. 4, one or more ridges may be employed. By reason of the snug fit of the cap member edge 32a between the projections 34a and 34b, when the gasket 34 is mounted to the cap member 32, the gasket 34 is mechanically and removably mounted to the inner 32a of the cap member 32 without the use of thermal bonding or adhesives.

While in the above described embodiments, a gasket is removably mounted to the respective first end member without the bonding of adhesives, in certain applications it may be desirable for the gasket to be permanently affixed to the first end member.

Figure 5:
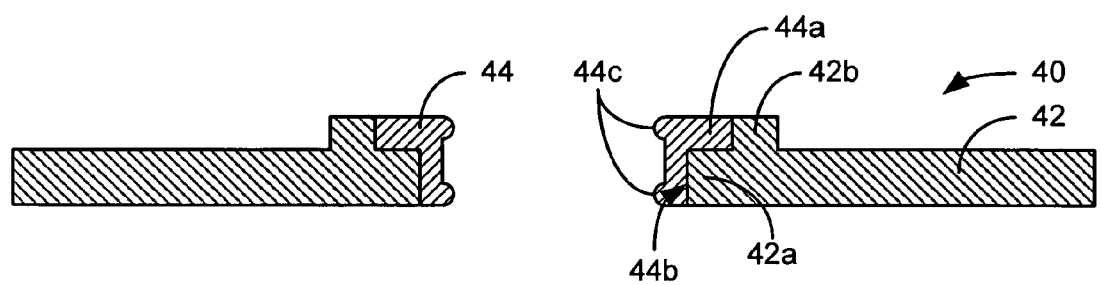
FIG. 5 is a cross-sectional view of a third alternative end cap design for use in the disposable filter cartridge depicted in FIG. 1.

Referring to the embodiment illustrated in FIG. 5, a first end member 40 includes a cap member 42 and an annular elastomeric gasket 44. The cap member 42 includes an inner edge that defines a generally circular opening in the cap member 42 and a riser 42b that extends generally perpendicular to the upper surface of the cap member 42. The cap member edge 42a and the riser 42b define a notch therebetween. The gasket 44 includes a projection that extends into the notch when the gasket 44 is mounted to the cap member 42. The cap member 42 inner edge includes plural surfaces that abut the gasket 44 and the gasket is fixedly mounted to the inner edge by bonding or gluing the gasket to at least one but not all of the plural surfaces of the inner edge of the cap member edge 42a.

The gasket 44 further includes two spaced inward projecting annular ridges 44c. In the illustrated embodiment, the ridges 44c have a generally semi-circular cross section although the ridges 34c may have a generally rectangular, trapezoidal or any other suitable cross-section. Additionally, while two inwardly projecting ridges 44c are depicted in the embodiment depicted FIG. 5, one or more ridges may be employed. The ridges 44c of the gasket 44 abut the outer surface of an inlet tube (not shown) when the filter cartridge is mounted within a filter housing, so as to provide a fluidic seal between the cap member 42 and the inlet tube.

Figure 6A:
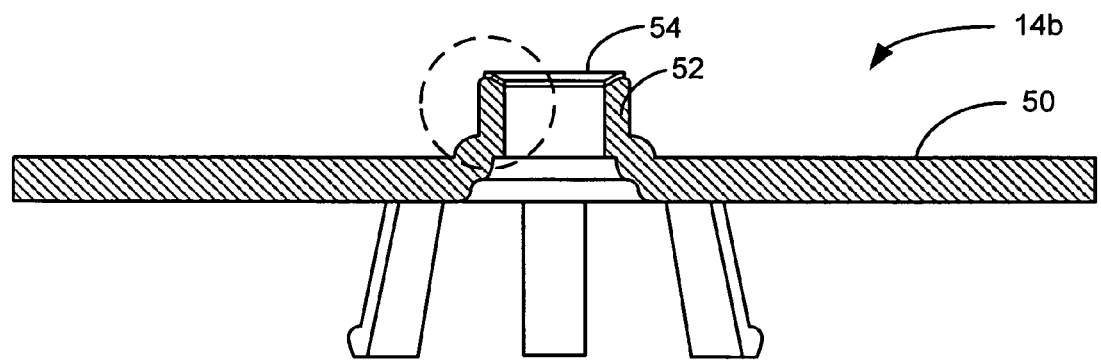
FIG. 6a is a partial cross-sectional view of the second end cap of FIG. 1.
Figure 6B:
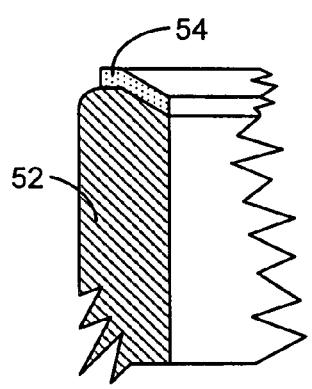
FIG. 6b is partial cross sectional view of a portion of FIG. 6a illustrating a sealing gasket on the second end cap.

The filter 10 further includes a second end cap 14b which is illustrated in FIGS. 6a and 6b. The second end cap 14b includes a body portion 50 having a generally cylindrical portion 52 extending from the body portion 50. The generally cylindrical portion 52 has an inner end and a through-bore and projects in the direction of the first end cap 14a when the second end cap 14b is assembled within the filter cartridge 10.

An annular rubber or other elastomeric sealing gasket 54 is affixed to the inner end of the generally cylindrical portion 52 to provide a sealing surface that also serves to promote alignment of the filter cartridge 10 with respect to the inlet tube. The gasket 54 has an annular angled sealing surface that faces the first end cap 14a and that forms a seal between the inner end of the generally cylindrical portion 52 and the confronting end of the inlet tube when the filter cartridge 10 is installed within a housing. More specifically, when mounted within a filter housing, the end of the inlet tube abuts the angled sealing surface of the elastomeric gasket 54 to provide an effective seal therebetween.

The gasket 64 may be affixed to the second end cap 14b via thermal bonding, via use of an adhesive, or via the use an adhesive that is applied at elevated temperature and under pressure. Alternatively, when molding the second end cap 14b the elastomeric gasket 64 may be pre-formed, placed within a mold and affixed to the second cap 14b in an insert molding process.

It should be noted that modifications to and variations of the disclosed first and second end cap designs may be made to accommodate use in different automobiles and applications without departing from the inventive concepts disclosed herein. Accordingly, the invention should not be viewed as limited except as by the scope and spirit of the appended claims.

What is claimed is:

1. A disposable filter cartridge comprising:
   a pleated filter member having opposing ends and a central bore; and
   first and second unitary end caps mounted to said opposing pleated filter member ends, said first end cap having an inner raised portion that generally defines an opening that is communicative with said central bore, the raised portion having at least one annular recess for receiving a gasket;
   a first annular elastomeric gasket having a surface of a first inner diameter facing said opening, said gasket retained in said at least one annular recess of the raised portion of the first end cap, said gasket having at least two annular ridges extending toward the interior of said opening, said annular ridges each having an innermost edge of a second inner diameter smaller than said first inner diameter, said gasket being in abutting relation with the raised portion along the entire height of the gasket.

2. The cartridge of claim 1 wherein said first end cap comprises a plastic end cap.

3. The cartridge of claim 1 wherein said first and second end caps comprise plastic end caps.

4. The cartridge of claim 1 wherein said at least one annular recess has a generally rectangular cross section.

5. The cartridge of claim 1 wherein each of said ridges has a generally semicircular cross section.

6. The cartridge of claim 1 wherein said second end cap includes a base portion and an integrally formed generally cylindrical portion extending from said base portion toward said first end cap, said generally cylindrical portion having a through bore and an inner end, said cartridge further including a second annular elastomeric gasket on said inner end of said generally cylindrical portion of said second end cap.

7. The cartridge of claim 6 wherein said second gasket includes an annular angled surface facing said first end cap and configured to seal against a confronting tube end.

8. The cartridge of claim 6 wherein said second gasket comprises a rubber gasket.

9. A disposable filter cartridge comprising:
   a pleated filter member having opposing ends and a central bore;
   first and second unitary end caps mounted to said opposing pleated filter member ends, said first end cap having an inner raised portion that generally defines an opening that is communicative with said central bore, the raised portion having at least one annular recess for receiving a gasket; and
   a first annular elastomeric gasket having a surface of a first inner diameter facing said opening, said gasket retained in said at least one annular recess of the raised portion of said first end cap, said first gasket having a plurality of annular ridges having inner edges, said inner edges disposed within said opening and having a second inner diameter smaller than said first inner diameter such that a circumference formed by the inner edge of each of said annular ridges is of the same diameter and is coaxially aligned with the inner edges of the other ones of said plurality of annular ridges around a common axis through said central bore.

10. The cartridge of claim 9 wherein said first end cap comprises a plastic end cap.

11. The cartridge of claim 9 wherein said first and second end caps comprise plastic end caps.

12. The cartridge of claim 9 wherein said first gasket is removably mounted in the at least one annular recess in the inner raised portion of said first end cap.

13. The cartridge of claim 9 wherein said first gasket is affixed to said first end cap via use of an adhesive that is selectively applied to some but not all of the portion of said gasket that abuts said inner raised portion of said first end cap.

14. The cartridge of claim 9 wherein said second end cap includes a base portion and an integrally formed generally cylindrical portion extending from said base portion toward said first end cap, said generally cylindrical portion having a through bore and an inner end, said cartridge further including a second annular elastomeric gasket on the said inner end of said generally cylindrical portion of said second end cap.

15. The cartridge of claim 9 wherein said second gasket includes an annular angled surface facing said first end cap and configured to seal against a confronting tube end.

16. The cartridge of claim 9 wherein said second gasket comprises a rubber gasket.

* * * * *

UNITED STATES PATENT AND TRADEMARK OFFICE
CERTIFICATE OF CORRECTION

PATENT NO.         : 6,991,112 B2
APPLICATION NO. : 10/373311
DATED              : January 31, 2006
INVENTOR(S)       : Sangsun Ham It is certified that error appears in the above-identified patent and that said Letters Patent is hereby corrected as shown below:

Title Page (73) Assignee, "Romanow Enterprises, Inc." should read --Romanow Enterprises, Inc., d/b/a MR Trading Overseas--;

Column 6, claim 15, line 61, "of claim 9" should read --of claim 14--; and

Column 6, claim 16, line 64, "of claim 9" should read --of claim 14--.

Signed and Sealed this

Twenty-seventh Day of November, 2007

JON W. DUDAS
*Director of the United States Patent and Trademark Office*